United States Patent
Zhao et al.

(10) Patent No.: US 7,636,377 B2
(45) Date of Patent: Dec. 22, 2009

(54) OPTICAL DISC RECORDER LASER POWER CONTROL

(75) Inventors: Yuanping Zhao, San Jose, CA (US); Hung P. Dang, Santa Clara, CA (US)

(73) Assignee: LSI Corporation, Milpitas, CA (US)

(*) Notice: Subject to any disclaimer, the term of this patent is extended or adjusted under 35 U.S.C. 154(b) by 228 days.

(21) Appl. No.: 11/090,528

(22) Filed: Mar. 25, 2005

(65) Prior Publication Data
US 2006/0215532 A1    Sep. 28, 2006

(51) Int. Cl.
*H01S 3/00* (2006.01)
(52) U.S. Cl. ............. 372/38.07; 372/38.1; 372/38.02; 372/38.01
(58) Field of Classification Search ............. 372/38.07, 372/38.1, 38.01, 38.02
See application file for complete search history.

(56) References Cited

U.S. PATENT DOCUMENTS

| | | | |
|---|---|---|---|
| 6,324,197 B1* | 11/2001 | Suda ................... | 372/38.01 |
| 6,671,248 B2 | 12/2003 | Miyabata et al. ...... | 369/116 |
| 6,674,702 B2* | 1/2004 | Asada et al. .......... | 369/47.52 |
| 6,731,586 B2 | 5/2004 | Seo et al. ............. | 369/116 |
| 6,744,031 B1 | 6/2004 | Suzuki ................. | 250/205 |
| 6,795,099 B2* | 9/2004 | Koga et al. ........... | 347/129 |
| 6,855,919 B2* | 2/2005 | Taguchi ............... | 250/205 |
| 2001/0046242 A1* | 11/2001 | Kawakami et al. ...... | 372/38.02 |
| 2003/0002552 A1* | 1/2003 | Nagara ................. | 372/38.02 |
| 2003/0095579 A1* | 5/2003 | Ito et al. .............. | 372/38.01 |
| 2003/0112732 A1* | 6/2003 | Masui et al. .......... | 369/59.12 |
| 2003/0235126 A1* | 12/2003 | Kawakami et al. ...... | 369/53.22 |
| 2005/0053107 A1* | 3/2005 | Katada et al. ......... | 372/38.07 |

OTHER PUBLICATIONS

Applying the AN10E40 Control of Thermo-Electric Coolers in Laser Diode Systems; Anadigm; App Note 011, AP020800-U011; www.anadigm.com.

* cited by examiner

*Primary Examiner*—Minsun Harvey
*Assistant Examiner*—Kinam Park
(74) *Attorney, Agent, or Firm*—Suiter Swantz pc llo

(57) ABSTRACT

The present invention is directed to an optical disc recorder laser power control apparatus utilizing two different current sources to solve the problem caused by the contradiction between control resolution and control range. The first current source and the second current source are connected in parallel to a single control output pin. The first current source and the second current source may work independently from each other. The laser driver controls emission power of one of the laser diodes with a driving current supplied from the single control output pin coupled to both the first current source and the second current source. Advantageously, the fine laser power control pitch from the first current source contributes to fine control resolution, while the coarse laser power control from the second current source provides a wide control range for various kinds of laser diodes.

16 Claims, 3 Drawing Sheets

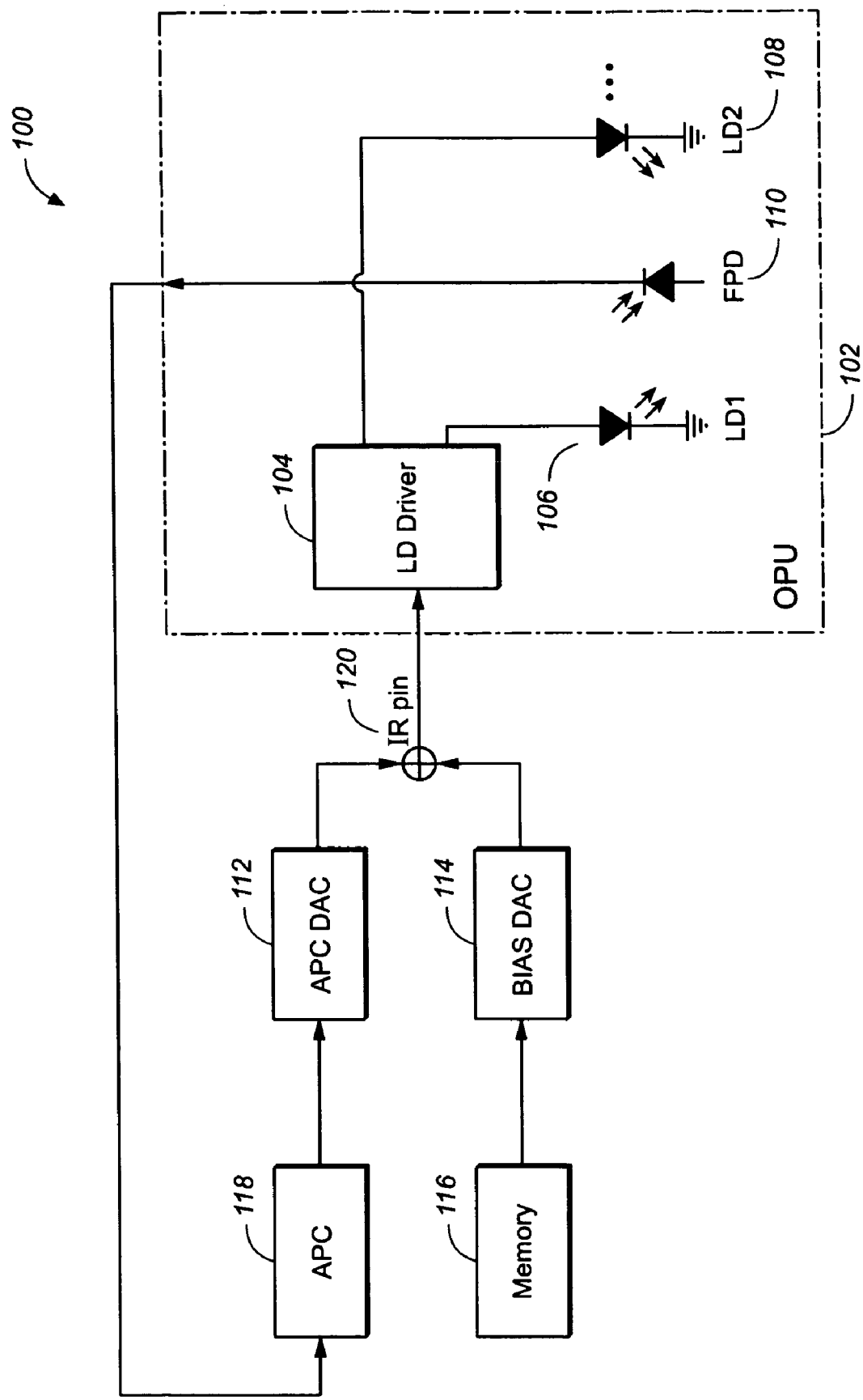
FIG._1

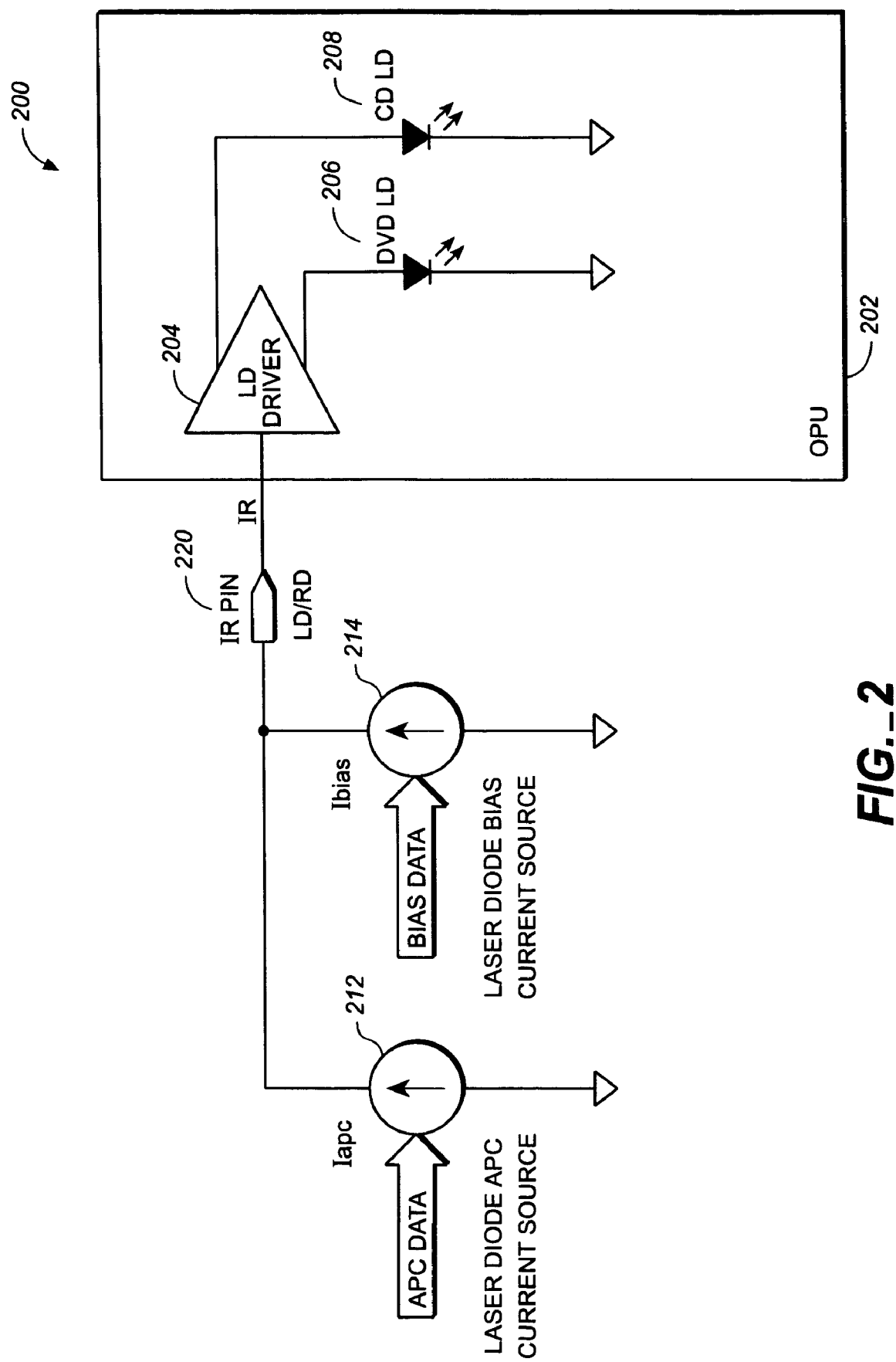
FIG._2

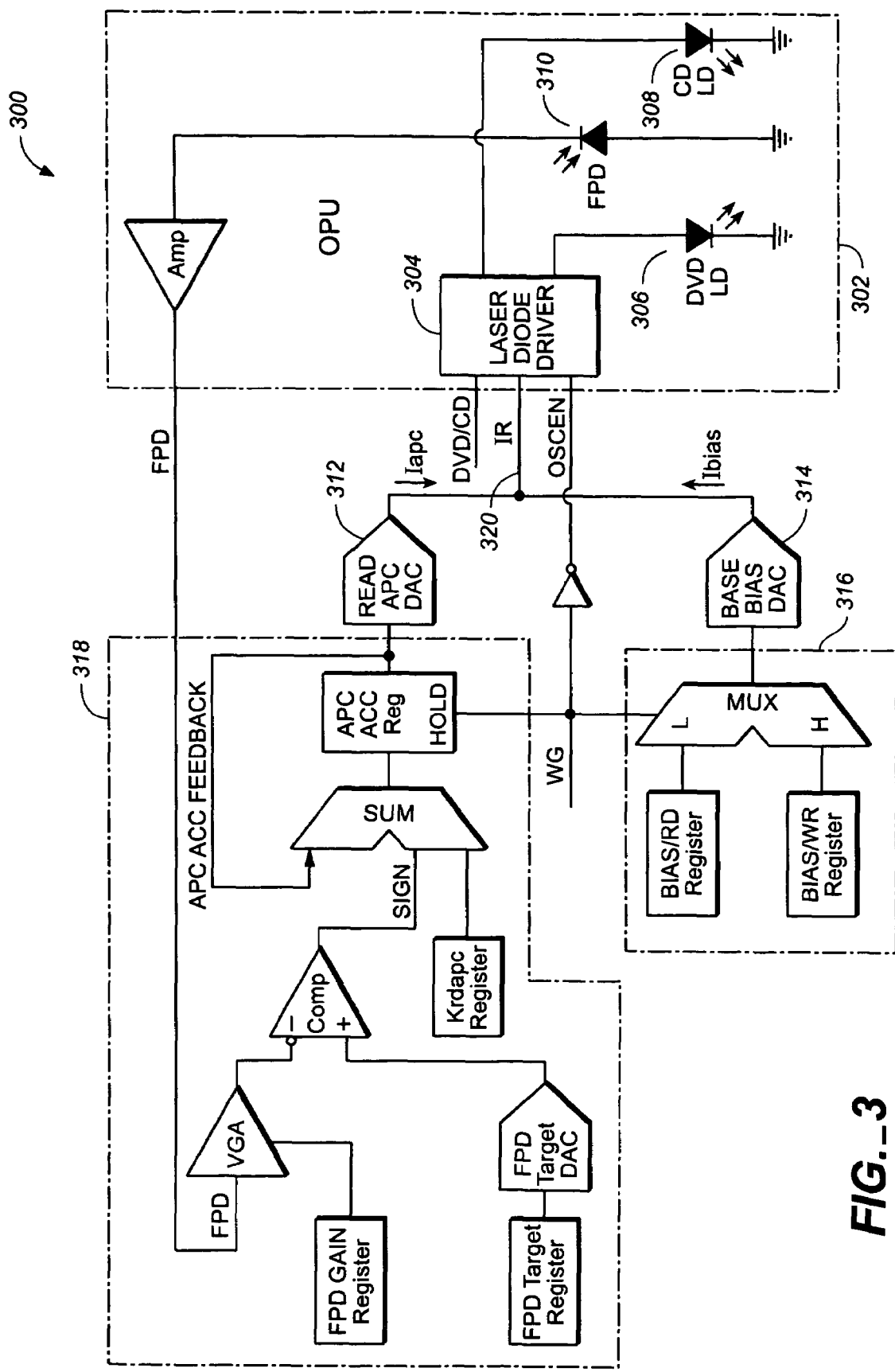
FIG._3

OPTICAL DISC RECORDER LASER POWER CONTROL

FIELD OF THE INVENTION

The present invention generally relates to the field of an information recording and reproducing apparatus, and particularly to an optical disc player and/or recorder laser power control circuit.

BACKGROUND OF THE INVENTION

In recent years, a demand for an optical disc recorder apparatus capable of reproducing and recording information on various kinds of optical discs has been increasing on the market. For example, consumers desire to have an optical disc player and/or recorder that can read and write Recordable/Rewritable Compact Discs (CDs), Recordable/Rewritable Digital Versatile Discs (DVDs), and the like. Typically, such an optical disc player and/or recorder includes at least two kinds of laser diodes such as a CD laser diode and a DVD laser diode.

Optical disc laser power for read channel needs a very fine pitch control so as to make the laser power stability high enough for data read back. Conventionally, the control step size is expected well under 1.0% of controlled target power. In case of 1.0 mW laser emission power for reading or reproducing information, finer than 0.01 mW of power control step size is expected. The current that drives laser diode for generating laser power needs a wide control range to cover both a CD laser diode and a DVD laser diode. The CD laser diode is more sensitive than the DVD laser diode, requiring less driving current than that required by DVD laser diode under the same laser power emission. Thus, for up-to-date optical disc players and/or recorders, the laser diode control circuit should be capable of covering the most sensitive CD laser diode and the least sensitive DVD laser diode, typically ranging from 20 mA to 60 mA.

In the past, the optical disc laser power was controlled by an analog loop. Thus, the control resolution was not a problem, but stability and control ability became problems. Later, the optical disc laser power is controlled by a digital loop. A digital loop is easy to manipulate compared to an analog loop. Conventionally, a single Digital to Analog Converter (DAC) has been utilized in a digital loop to control the laser power for reading. However, this approach causes the contradiction between control resolution and control range, especially when a low cost and low resolution DAC is used. For a single non-idea practical DAC, the wide control range means larger step size; but the larger step size results in rough control resolution. In case the fine control pitch is adapted for higher resolution, the control range will be reduced, resulting in some required control area uncovered.

Therefore, it would be desirable to provide an apparatus of optical disc laser power control which solves problems caused by the contradiction between control resolution and control range, and have both fine control resolution and wide control range features at the same time.

SUMMARY OF THE INVENTION

Accordingly, the present invention provides an optical disc recorder laser power control apparatus utilizing two different current sources, in a format of dual DACs, to solve the problem caused by contradiction between control resolution and control range.

In a first aspect of the present invention, an optical disc laser power control circuit includes a plurality of laser diodes, such as a CD laser diode and a DVD laser diode, for emitting laser beams having different wavelengths, and a laser driver coupled to a switch circuit for selectively connecting a required laser diode from the plurality of laser diodes. The optical disc laser power control circuit includes a photodetector, and an amplifier (e.g. current-to-voltage conversion amplifier, or the like) connected to an output of the photo detector. The amplifier may be capable of adjusting conversion resistance values and have differently designed center conversion resistance values.

In an additional aspect of the present invention, a dual current source including a first power source being a fine current source and a second power source being a coarse current source may be utilized. An automatic power control circuit may control the first current source in a mixed signal control loop. The first current source and the second current source are coupled in parallel to a single control output pin of an optical disc controller chip. The laser diode driver controls emission power of the laser diodes with a driving current supplied from the single control output pin coupled to both the first current source and the second current source. The photodetector detects at least part of the laser beams emitted from one of the laser diodes to convert a detected part of the laser power into an electrical signal.

In a further aspect of the present invention, the first current source and the second current source may work independently from each other. The second current source may provide a laser diode DC bias current that is to be set at different values for either read or write operations. The second current source may accept a predetermined laser diode working current without any calculation. Further, the second current source may be operable as if the automatic power control loop is independently controlled.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is a schematic block diagram of illustrating an optical disc laser power control apparatus in accordance with an exemplary embodiment of the present invention;

FIG. 2 is a schematic block diagram of illustrating a dual current source system for the optical disc laser power control apparatus in accordance with an exemplary embodiment of the present invention; and FIG. 3 is a schematic block diagram of illustrating a further example of an optical disc laser power control apparatus in accordance with an exemplary embodiment of the present invention.

DETAILED DESCRIPTION OF THE INVENTION

Reference will now be made in detail to the presently preferred embodiments of the invention, examples of which are illustrated in the accompanying drawings.

The present invention is directed to an optical disc recorder laser power control apparatus that utilizes two different current sources to solve the problem caused by the contradiction between control resolution and control range. The present invention may utilize a dual current source including a first power source that is a fine current source and a second power source that is a coarse current source. The first current source and the second current source are connected in parallel to a single control output pin. An automatic power control circuit (APC) may control the first current source in a mixed-signal control loop. The second current source may be operable as if the mixed-signal control loop is independently controlled. A Laser Diode (LD) driver in the optical disc recorder power control apparatus may control emission power of one of the laser diodes with a driving current supplied from the single control output pin.

In the following description, numerous specific descriptions are set forth in order to provide a thorough understanding of the present invention. It should be appreciated by those skilled in the art that the present invention may be practiced without some or all of these specific details. In some instances, well known process operations have not been described in detail in order not to obscure the present invention.

Referring now to FIG. 1, a block diagram of an example of an optical disc laser power control apparatus 100 is shown.

In an embodiment of the present invention, the optical disc laser power control apparatus 100 includes an Optical Pickup Unit (OPU) 102 coupled to two different current sources such as a fine current source 112 and a coarse current source 114. The first current source 112 and the second current source 114 are connected in parallel to a single control output pin 120, which will provide a control current to OPU's read current input pin (IR). The fine current source 112 and the coarse current source 114 may work independently from each other. In one embodiment, a fine current source 112 may be an Automatic Power Control (APC) loop controlled current source and a coarse current source 114 may be a BIAS current source. The BIAS current source 114 may be coupled to a digital memory 116 storing the previously determined laser diode working current value. The APC current source 112 may be coupled to Automatic Power Control circuit 118 which controls the APC current source 112 in a closed mixed-signal control loop (e.g. an APC loop).

The OPU 102 may include a LD driver 104, multiple laser diodes 106, 108, a Front Monitoring Photodetector (FPD) 110, and the like. The LD driver 104 may control emission power of each of the multiple laser diodes 106, 108 with a driving current supplied from the IR output pin 120 coupled to both the fine current source 112 and the coarse current source 114. An example of the multiple laser diodes may include a CD laser diode, a DVD laser diode, and the like. The LD driver 104 may be connected to a switch circuit (not shown) for selectively connecting a required laser diode from the multiple laser diodes. The FPD 110, or the like, detects at least part of the laser power emitted from one of the laser diodes 106, 108 to convert a detected part of the laser beams into an electrical signal. The FPD 110 may feed the electric signal back to the APC circuit 118 to adjust a current output of the APC loop.

In an embodiment of the present invention, the laser diodes 106, 108 in the OPU may be selected depending upon the type of the optical disc that is currently accessed. Laser emitted from the selected laser diode 106, 108 is irradiated on the optical disc. The part of the laser emitted from the selected laser diode 106, 108 may be fed through the FPD 110 back to the APC circuit 118, where it is used for a variety of control operations.

Referring now to FIG. 2, a block diagram of a dual current source system 200 for the optical disc laser power control apparatus is shown. In an exemplary embodiment of the present invention, the dual current source 200 may include APC current source Iapc 212 being the first current source and bias current source Ibias 214 being the second current source. Ibias 214 may serve as a coarse DC current source that sets the laser diode current according to a predetermined (specified) working current value. Typically, OPU manufacturers measure the working current for each laser diode included in the OPU 202 and store the working current values in a memory unit (not shown) such as a Bar Code Label, a QR Code Label, a EEPROM, or the like. In one embodiment, Ibias 214 may be determined by a laser diode current value found from a Bar Code Label, a QR Code Label, an EEPROM, or the like, or from a digital memory which is coupled to Ibias 214. Iapc 212 is controlled by an APC circuit in a closed loop, serving as a fine current source. As described above, both Iapc 212 (the first current source) and Ibias 214 (the second current source) are connected in parallel to an IR output pin 220 coupled to the LD driver 204.

In a further exemplary embodiment, Ibias 214 may require 6-bit digital control, with each Least Significant Bit (LSB) contributing 10 uA output current. The full scale of the Ibias Digital Analog Converter (DAC) may be 630 uA, in 64 steps. In an embodiment, Iapc 212 may require 8-bit digital control, with each LSB contributes 0.2 $\mu$A output current. The full scale of Iapc DAC may be 51 $\mu$A, in 256 steps. For example, when the OPU 202 has a LD driver 204 that provides a current gain of 100, each of Ibias control steps may result in 1000 $\mu$A, or 1 mA, driving current on the laser diode 106, 108. Both Ibias control steps and the specified working current values are in a unit of mA. Thus, such Ibias control steps are useful and convenient to set up the predetermined laser diode working current. Further, each of the Iapc steps may result in 20 $\mu$A driving current on the laser diode. Such a fine pitch current step (the Iapc step) may cause the DVD laser power to change 0.0034 mW, or the CD laser power to change 0.0056 mW. In the exemplary embodiment, Ibias 214 may be able to provide up to 63 mA of the laser diode 106, 108 driving current while Iapc 212 could provide up to 5.1 mA driving current. Thus, the resulted total laser diode driving current I will be the summation of both channels:

$I$(laser diode)=[Driver Gain]*(Iapc+Ibias).

As such, when the current source has 1 mA/LSB laser diode current resolution, the specified laser diode working current values (predetermined by the OPU manufacturer) may be used directly without any conversion or calculation. As described above, the specified laser diode working current values are in the unit of mA. Thus, Ibias 214 may obtain the working current value from the memory to set Ibias DAC without any calculation. Further, the specified laser diode working current value may be used to set the Ibias DAC without considering the related APC loop. In this manner, Iapc 212 and Ibias 214 are controlled independently and their individual contributions may be combined as the driving source of the laser diode driver 204.

Referring now to FIG. 3, a detailed block diagram of a further example of an optical disc laser power control apparatus 300 is shown.

It is to be noted that the optical disc laser power control apparatus 300 including various specific circuits is shown for the illustrative purposes only. In an embodiment of the present invention, an OPU 302 may include a LD driver 304 and a Front Monitoring Photodetector (FPD) 310 coupled to an amplifier. A Read APC DAC 312 (supplying a first current source) and a BASE BIAS DAC (supplying a second current source) 314 may be utilized to supply control currents for the laser diode driver 304. The Read APC DAC 312 may be coupled to an APC circuit 318 that includes various circuit elements. The Base BIAS DAC 314 may be coupled to a memory unit 316. The memory unit 316 may include registers, a multiplexer and the like.

In read operations, a write control gate signal (e.g. WG) may be set to LOW indicating read operations. APC Accumulator/Register may be activated and its output is converted into Iapc (the first current source) by READ APC DAC 312. Meanwhile BIAS/RD Register may be selected by the multiplexer and its value is converted into Ibias (the second current source) by BASE BIAS DAC 314. Furthermore, Radio Frequency (RF) modulation for laser power is activated on OPU 302 through OSCEN being set to HIGH.

In one embodiment, the second current source (e.g. Ibias) may be utilized for maintaining the same laser bias power level since the second current source can utilize a predetermined laser diode working current value that has been stored in the memory unit 316. For example, in write operations, the write control gate signal (WG) may be set to HIGH indicating write operations. The RF modulation for the laser power control apparatus may be disabled through OSCEN being set to LOW. BIAS/WR Register is selected by the multiplexer so as to provide the laser diode bias current (the second current source) for maintaining the same laser bias power level during the write operation with RF modulation shutting down.

In an exemplary embodiment, an APC loop 318 may start when it receives an output from the FPD 310 of the OPU 302. Laser power emitted from the laser diodes 306, 308 may be detected and converted into an electrical signal. The voltage level of the FPD output may reflect the laser power level. For example, the lower level of the FPD output may indicate higher laser power. In the APC loop 318, the FPD output is amplified and adjusted by various amplifiers and circuits. For example, FPD output is first amplified by Variable Gain Amplifier (VGA) that has an adjustable gain controlled by FPD GAIN Register. It is to be noted that different gains may be required for different laser diodes. The FPD output has different sensitivity for different laser diodes. The FPD output signal may be compared with a FPD target preset level generated by FPD Target DAC under the control of FPD Target Register.

It is to be noted that it is known to the art that the laser power is adjusted in a mixed-signal control loop if the laser power does not meet the target level. It should be appreciated that there are numerous ways to implement a control loop for the optical disc laser power control. In one embodiment of the present invention, when the laser power for the OPU 302 is determined to be lower than target preset level, the laser power is increased to the target preset level. When the laser power for the OPU 302 is determined to be equal or higher than target preset level, laser power is decreased. In a further embodiment of the present invention, the APC Accumulator/Register may be utilized to increase/decrease the first current source level. The APC Accumulator/Register counts up and down alternatively, resulting in one LSB jump up and down at READ APC DAC output. As such, during the normal closed loop operation, the laser power is automatically maintained with the allowed stability range.

In an embodiment of the present involution, when the laser power for the OPU 302 is lower than the target preset level, the comparator outputs LOW. The SIGN for the summation is positive. Thus, the APC Accumulator/Register counts up according to the coefficient Krdapc set up by Krdapc Register. As a result, the laser power is increased. When the laser power for the OPU 302 is equal or higher than the target preset level, the comparator outputs HIGH. The SIGN for the summation becomes negative. Thus, the APC Accumulator/Register counts down according to the coefficient Krdapc. As a result, the laser power is decreased.

During the write mode, the write control gate signal (WG) is HIGH and OSCEN becomes LOW, forcing the APC Accumulator/Register into hold mode. So the APC loop 318 may become frozen for a write operation, maintaining the same output value as the read mode when the WG was LOW. In one embodiment, Krdapc Register value may be set to zero in order to freeze the APC loop 318. In another embodiment, a non-zero Krdapc Register value could determine the adjustment speed of the APC loop 318.

Advantageously, the present invention may provide many useful features. The present invention may support various kinds of laser diodes that need different working currents. The fine laser power control pitch may provide required step size toward excellent control resolution. The coarse DC current may be utilized for setting up laser diode bias working currents that vary among laser diodes and their wavelengths. The coarse control works independently from the fine control mixed-signal loop. With the coarse control, a wide control range may be obtained to cover various kinds of laser diodes with different working currents.

It is believed that the optical disc recorder laser power control apparatus of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An optical disc laser power control circuit, comprising:
   at least two laser diodes for emitting laser beams, the laser beam being emitted for reproducing or recording data from/to an optical disc;
   a first current source;
   a second current source coupled to the first current source, the second current source and the first current source coupled in parallel to a single control output;
   a memory unit coupled to the second current source, the memory unit configured for storing a predetermined laser diode working current value;
   a laser diode driver for controlling emission power of one of the at least two laser diodes with a driving current supplied from the single control output;
   a photodetector for detecting at least part of laser beams emitted from the laser diode to convert the emitted laser power into an electrical signal, where the electrical signal is configured to be fed back to the automatic power control circuit;
   an amplifier coupled to an output of the photodetector, where the amplifier is configured to adjust at least one conversion resistance value; and
   an automatic power control circuit coupled to the first current source, the automatic power control circuit for controlling the first current source, where the automatic power control circuit is configured for comparing the converted electrical signal and a target laser power and is configured to adjust the first current source based on a compared converted electrical signal and a target laser power, where a register value is set to zero when the automatic power control circuit is frozen during a write operation;

wherein the ratio of the full scale current output values of the first current output mode DAC and the second current output mode DAC lies between eight and eighty, and wherein the first current source is a fine pitch current source, the second current source is a coarse current source configured to set a current based on the predetermined laser diode working current value, and the first current source is configured to be operable independent from the second current source.

2. The optical disc laser power control circuit as described in claim 1, wherein the memory unit includes a rewritable digital memory.

3. The optical disc laser power control circuit as described in claim 1, wherein the memory unit includes microprocessor controlled data register.

4. The optical disc laser power control circuit as described in claim 1, wherein the first current source is frozen for writing operations.

5. The optical disc laser power control circuit as described in claim 1, wherein the second current source is utilized for both reading and writing operations.

6. The optical disc laser power control circuit as described in claim 5, wherein the second current source has different output currents depending on a type of operation which include both a reading operation and a writing operation.

7. The optical disc laser power control circuit as described in claim 1, wherein both the first current source is implemented by a first current output mode DAC and the second current source is implemented by a second current output mode DAC.

8. The optical disc laser power control circuit as described in claim 7, wherein the first and second current output mode DACs have different full scale current output values.

9. An optical disc laser power control apparatus, comprising:
a plurality of laser diodes for emitting laser beams, the laser beams being emitted for reproducing or recording data from/to an optical disc;
a first current source;
a second current source coupled to the first current source, the second current source and the first current source coupled in parallel to a single output;
a memory unit coupled to the second current source, the memory unit configured for storing a predetermined laser diode working current value, wherein the second current source is a coarse current source configured for setting a current based on the predetermined laser diode working current value;
a laser diode driver for controlling emission power of the plurality of laser diode with a driving current supplied from the single output of the first current source and the second current source;
a photodetector for detecting at least part of laser beams emitted from one of plurality of the laser diodes to convert the emitted laser power into an electrical signal;
an amplifier coupled to an output of the photodetector, where the amplifier is configured to adjust at least one conversion resistance value;
an automatic power control circuit coupled to the first current source, the automatic power control circuit for controlling the first current source; and a register, the register configured to be set to zero when the automatic power control circuit is frozen during a write operation, wherein the ratio of the full scale current output values of the first current output mode DAC and the second current output mode DAC lies between eight and eighty, and wherein the first current source is a fine current source configured to be driven by a mixed-signal control loop that works independently from the second current source.

10. The optical disc laser power control circuit as described in claim 9, further comprising:
a microprocessor controlled data register.

11. The optical disc laser power control apparatus as described in claim 9, wherein the plurality of laser diodes includes a CD laser diode and a DVD laser diode.

12. The optical disc laser power control apparatus as described in claim 9, wherein the mixed-signal control loop receives an output from the photodetector, calculates a regulated laser power output through the automatic power control circuit and outputs the fine pitch laser power control signal to the first current source.

13. A method for an optical disc laser power control circuit, comprising:
providing a first current source and a second current source, the first current source and the second current source being coupled in parallel to a single control output pin; based on a driving current from the single control output pin, emitting laser beams for reproducing or recording data from/to an optical disc;
detecting at least part of the laser beams emitted;
converting the emitted laser power into a photodetector output signal;
outputting a laser power strength signal based on the photodetector output signal;
amplifying the photodetector output signal with an amplifier configured to adjust at least one conversion resistance value;
controlling a laser power strength dynamically via a closed mixed-signal loop;
setting a register value to zero when an automatic power control circuit loop is frozen during a write operation;
adjusting the laser power strength to a target preset level continuously; and
wherein the ratio of the full scale current output values of the first current output mode DAC and the second current output mode DAC lies between eight and eighty, and
wherein the first current source is a fine pitch current source and operable independently from the second current source, and the second current source is operable independently from the first current source, and the second current source is a coarse current source configured to set a current based on the predetermined laser diode working current value.

14. The method as described in claim 13, further comprising:
utilizing the second current source for write operations; and
for the write operations, setting a write control signal high in order to freeze the first current source.

15. The method as described in claim 14, further comprising:
utilizing the first current source and the second current source for read operations; and for the read operations, setting a write control signal low in order to activate automatic power control loop for laser power control.

16. The optical disc laser power control circuit as described in claim 1, further comprising:
   two laser diodes for emitting laser beams, the laser beam being emitted for reproducing or recording data from/to an optical disc;
   a first current source, the first current source including an Automatic Power Control Power Control loop controlled current source;
   a second current source coupled to the first current source, the second current source including a BIAS current source, the second current source and the first current source coupled in parallel to a read current input pin;
   an EEPROM coupled to the second current source, the EEPROM configured for storing a predetermined laser diode working current value;
   a laser diode driver for controlling emission power of one of the at least two laser diodes with a driving current supplied from the read current input pin;
   a photodetector for detecting at least part of laser beams emitted from the laser diode to convert the emitted laser power into an electrical signal, where the electrical signal is configured to be fed back to the automatic power control circuit;
   an amplifier coupled to an output of the photodetector, where the amplifier is configured to adjust at least one conversion resistance value; and
   an automatic power control circuit coupled to the first current source, the automatic power control circuit for controlling the first current source, where the automatic power control circuit is configured for comparing the converted electrical signal and a target laser power and is configured to adjust the first current source based on a compared converted electrical signal and a target laser power, where a register value is set to zero when the automatic power control circuit is frozen during a write operation;
wherein the ratio of the full scale current output values of the first current output mode DAC and the second current output mode DAC lies between eight and eighty, and
wherein the first current source is a fine pitch current source, the second current source is a coarse current source configured to set a current based on the predetermined laser diode working current value, and the first current source is configured to be operable independent from the second current source.

* * * * *